United States Patent [19]

Schrauwen et al.

[11] Patent Number: 5,442,187
[45] Date of Patent: Aug. 15, 1995

[54] DEVICE AND METHOD FOR POSITIONING THE SENSORS OF A WEB MOVEMENT CONTROL DEVICE

[75] Inventors: Hans J. Schrauwen, Hiddenhausen; Theodor Nacke, Leopoldshöhe; Jürgen Bettführ, Vlotho, all of Germany

[73] Assignee: BST Servo-Technik GmbH, Bielefeld, Germany

[21] Appl. No.: 232,591

[22] Filed: Apr. 25, 1994

Related U.S. Application Data

[63] Continuation of Ser. No. 15,829, Feb. 10, 1993, abandoned.

[30] Foreign Application Priority Data

Feb. 11, 1992 [DE] Germany .......... 42 03 952.5

[51] Int. Cl.⁶ .................................. G01N 21/86
[52] U.S. Cl. ...................... 250/548; 250/557; 250/559.32; 356/400
[58] Field of Search ............ 226/15, 19, 20; 250/548, 557, 560, 561, 571; 356/399, 400, 429

[56] References Cited

U.S. PATENT DOCUMENTS

| | | | |
|---|---|---|---|
| 3,724,732 | 4/1973 | Bonner | 226/21 |
| 4,054,251 | 10/1977 | Henderson et al. | 226/15 |
| 4,658,144 | 4/1987 | Croyle | 250/548 |
| 4,726,501 | 2/1988 | Wiley | 226/15 |
| 4,848,632 | 7/1989 | Mack et al. | |
| 4,991,761 | 2/1991 | Gneuenthel et al. | 250/560 |
| 5,021,673 | 6/1991 | Dragon et al. | 250/548 |
| 5,119,981 | 6/1992 | Gneuchtel et al. | 226/15 |

FOREIGN PATENT DOCUMENTS

| | | |
|---|---|---|
| 0243756 | 11/1987 | European Pat. Off. . |
| 0367368 | 5/1990 | European Pat. Off. . |
| 3203452 | 2/1986 | Germany . |
| 3533274 | 5/1987 | Germany . |
| 3614981 | 11/1987 | Germany . |
| 3702836 | 8/1988 | Germany . |
| 996626 | 6/1965 | United Kingdom . |

OTHER PUBLICATIONS

Von Dipl.-Ing. R. Burlefinger et al., "Electronische Bahnlaud—Regler mit Programmierbarer Logik," Paper + Kunststoff-Verarbeiter, vol. 10, 1982, pp. 22 and 23.

Primary Examiner—David C. Nelms
Assistant Examiner—Stephone B. Allen
Attorney, Agent, or Firm—Burns, Doane, Swecker & Mathis

[57] ABSTRACT

To reach an originally set web position again with a web movement control device following a tear in the web and renewed drawing-in of a web of material, sensors which can be adjusted independently of one another and coupled such that two sensors move synchronously in opposite directions are provided. During an edge search, the two sensors can be adjusted separately and independently of one another and moved synchronously in opposite directions for centre control after a tear in the web for repositioning the sensors.

12 Claims, 3 Drawing Sheets

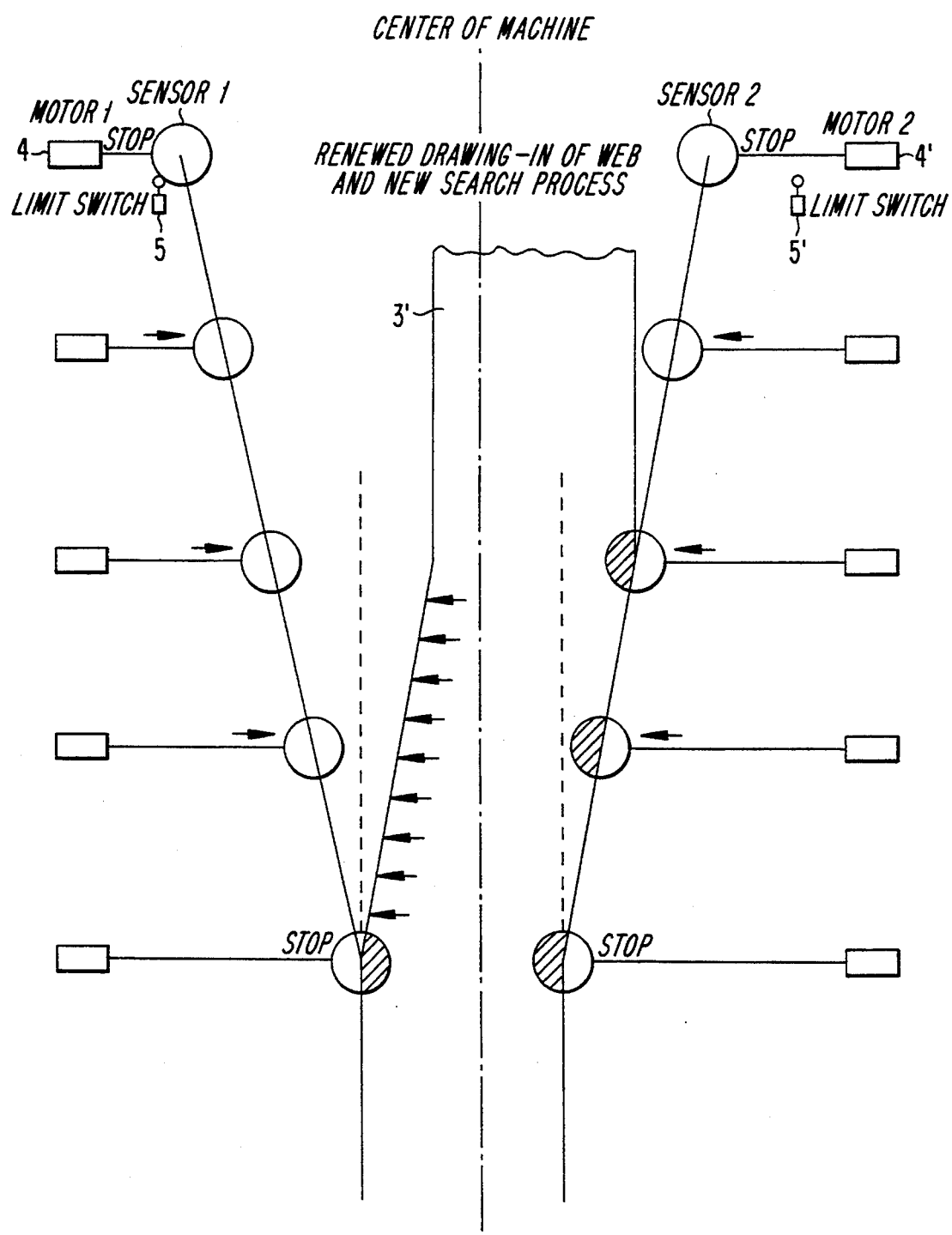

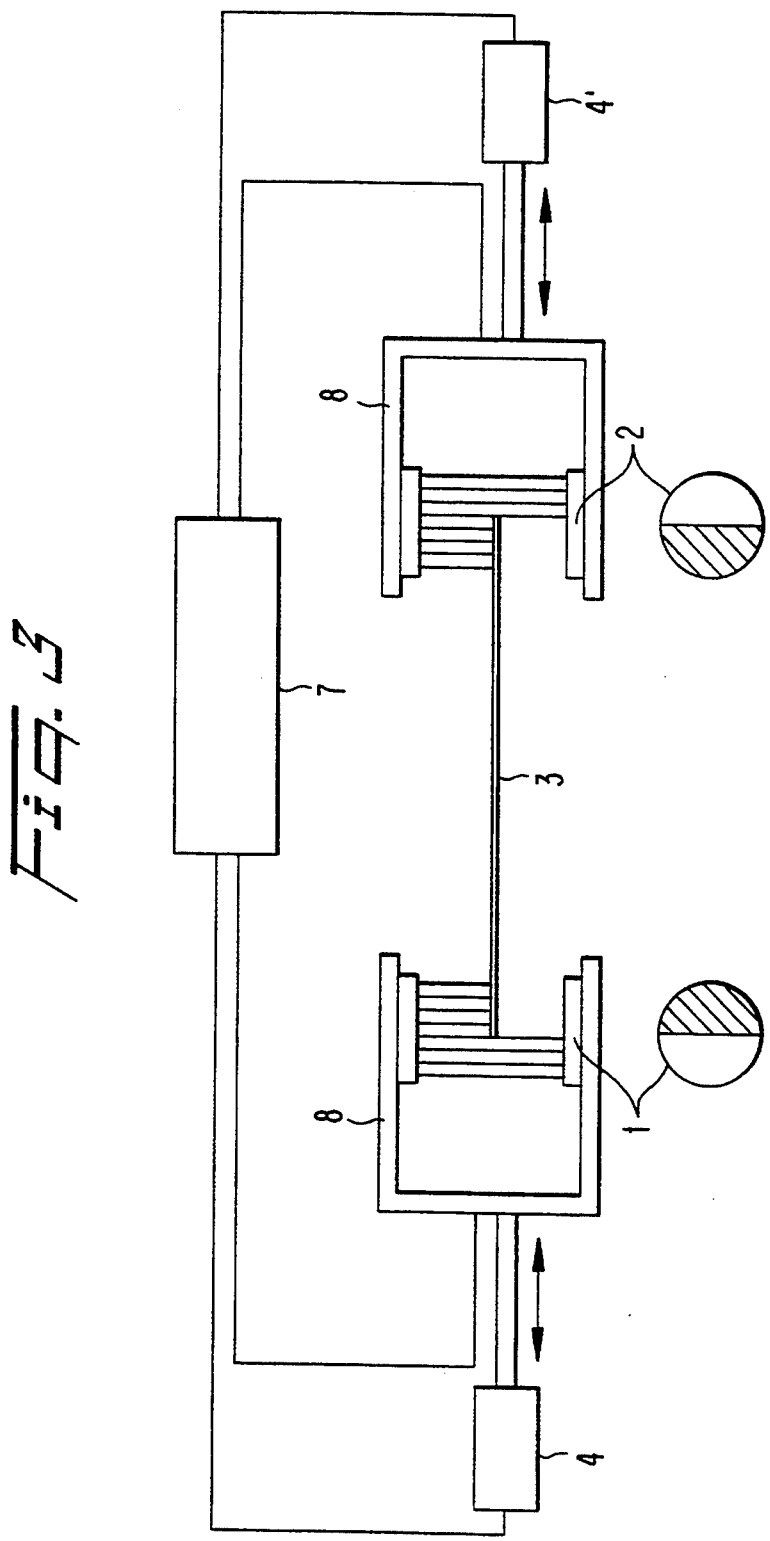

DEVICE AND METHOD FOR POSITIONING THE SENSORS OF A WEB MOVEMENT CONTROL DEVICE

This application is a continuation of application Ser. No. 08/015,829, filed Feb. 10, 1993, now abandoned.

BACKGROUND OF THE INVENTION

In web centre control, sensors are arranged on each side of a web to detect the edges of the web. Two sensors may be adjusted synchronously with respect to one another in opposite directions using a single-motor sensor adjustment device with threaded spindles running in opposite directions, to guide the centre of the web of material essentially to the centre of the machine. Displacement of the web of material or set value adjustment can only be performed in the measuring range of the sensors. The measuring range of the sensors is preset for example in the case of a circular, optical sensor by the diameter of the sensor. If a new web is drawn into the machine, the two sensors which are moved synchronously guide the web of material back onto the centre of the machine, after an edge search, irrespective of the position in which the web of material was drawn into the machine. After a tear in the web, the newly drawn-in web of material can thus be roughly prepositioned. Then, after an edge search, the sensors are moved synchronously to guide the web of material back to the centre of the machine.

If two independently adjustable sensors are provided for web centre control, a web of material can be controlled over the entire adjustment range of the two sensor adjustment devices, but the web of material must be drawn into the machine as accurately as possible in the position in which it is to be subsequently controlled. After a tear in the web or after a new edge search by the sensors, the previously set position of the web of material is lost so that repositioning is necessary.

SUMMARY OF THE INVENTION

The invention is based on the object of devising an apparatus and a method of the type specified above such that, for example after a tear in the web, the newly drawn-in web is quickly and accurately positioned by the sensors again in the, for example off-centre, position in which it was located before the tear in the web.

According to the invention, for sensor positioning which is triggered after a tear in the web a two-motor sensor adjustment device is used in the same way as a single-motor sensor adjustment device with spindles running in opposite directions for the two sensors. The two sensors are moved synchronously in opposite directions in the two-motor sensor adjustment device by the spindles which run in opposite directions. As a result, the advantages of two separate sensor drives and the advantages of a single-motor sensor adjustment device are combined with one another. Since the two sensor adjustment devices are always switched on and off simultaneously, the two sensors always cover the same adjustment path. As a result the preset web position can be obtained. Consequently, it is possible when drawing in the web after a tear to preposition the web of material only roughly, after which the web position set before the tear in the web is automatically achieved again. At the same time, the web of material can be controlled over the entire adjustment range of the sensor adjustment devices which can be driven separately from one another.

BRIEF DESCRIPTION OF THE DRAWINGS

The invention is explained in greater detail by way of example with reference to the drawing, in which:

FIG. 2 shows the same diagram of the sensor positioning after the drawing in of a new web of material; and FIG. 3 shows schematically two sensors on both sides of a web of material.

DETAILED DESCRIPTION OF THE PREFERRED EMBODIMENTS

Figure 1:
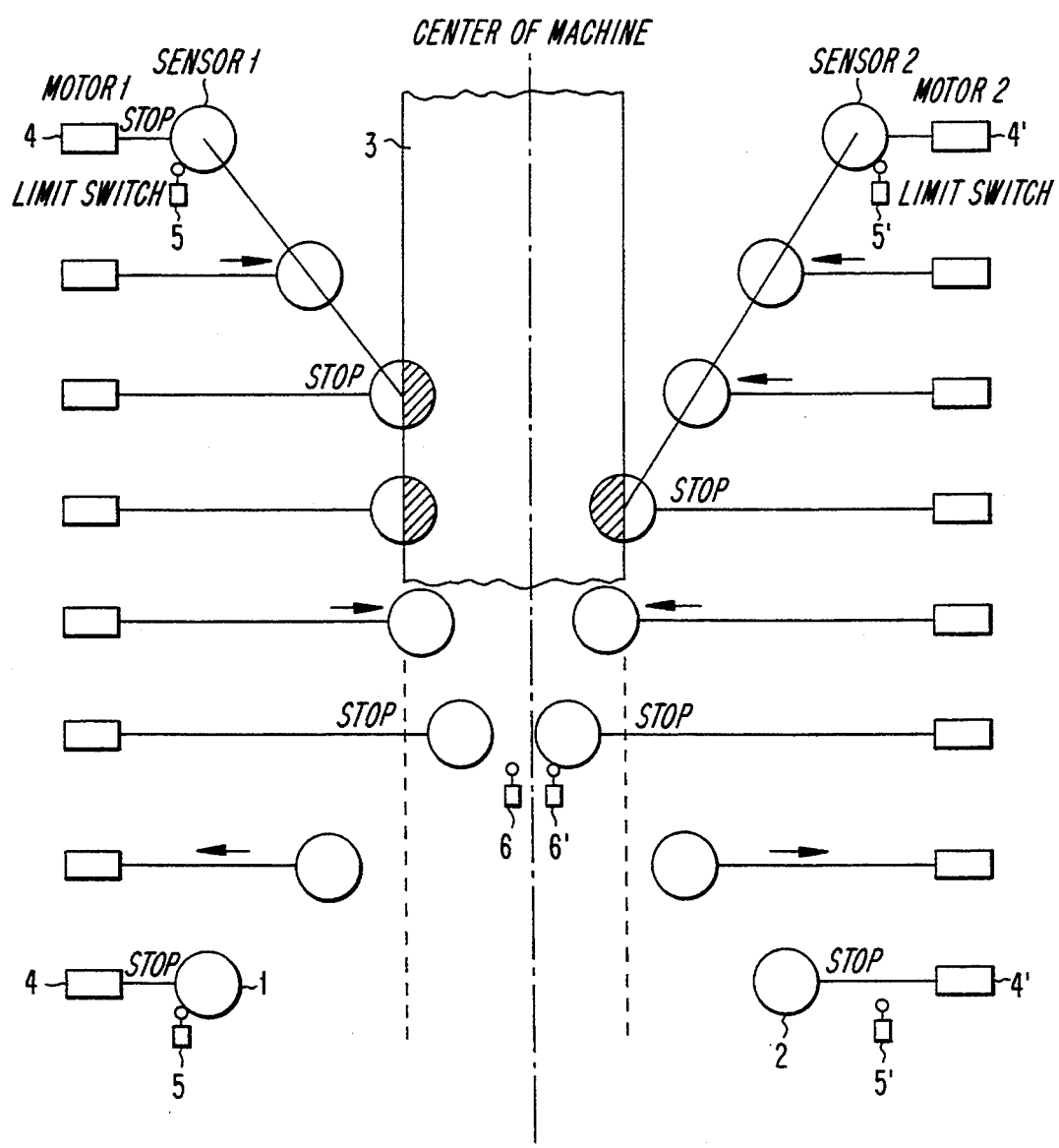
FIG. 1 shows a diagram view of an edge search and the sensor adjustment in the case of a tear in the web.

FIG. 3 shows circular optical sensors 1, 2 in a U-shaped holder 8, which can be adjusted by a sensor adjustment device 4, 4' on two sides of a web 3 of material. The edges of the web cover half of the sensors 1, 2 in each case. An electronic signal processing and control device 7 receives and processes the sensor signals. In addition, the sensor adjustment device 4, 4' for adjusting the holders 8 of the sensors 1, 2 is controlled by this control device 7.

In the figures, numerals 1 and 2 designate circular, optical sensors on each side of a web 3 of material. Each sensor 1, 2 is connected to an associated sensor adjustment device in the form of a motor 4, 4', for example by a threaded spindle driven by the motor so that the sensor can be moved onto and away from the web 3. The electronic signal processing device 7 receives and processes the signals emitted by the sensors 1 and 2 for web movement control (not described in greater detail) and to drive the motors 4 and 4' for positioning the sensors 1 and 2.

In FIG. 1, an initial position is assumed in which the two sensors 1 and 2 each rest against an associated limit switch 5 or 5'. These limit switches 5, 5' are arranged symmetrically with respect to the centre of the machine. The web 3 of material to be controlled is inserted off-centre into the machine. Starting from the outer limit position, the two sensors 1 and 2 are moved inwards independently of one another onto the web 3. Initially, the left-hand sensor 1 is the first to reach the edge of the web is due to the off-centre arrangement of the web 3 and is positioned on the web such that the centre of the sensor which forms the working point is aligned with the edge of the web. In this position, the sensor 1 is stopped while the sensor 2, which has not yet reached the edge of the web, continues to move inwards, as indicated by an arrow. As soon as the sensor 2 reaches the edge of the web, it is stopped and positioned in the same manner with its centre on the edge of the web.

After this edge search and positioning of the two sensors 1 and 2, drive motors 4 and 4', which until now have been controlled independently of one another, are coupled to one another electrically for example by an external switch or by a preset program step so that the two sensors 1 and 2 can only be adjusted synchronously in opposite directions to one another by the motors 4 and 4'. After the electrical coupling of the two sensor adjustment devices, web centre control is switched on and the movement of the web 3 is controlled such that the two edges of the web cover the two sensors to the same extent. The web 3 of material covers in each case one half of a sensor, as indicated by hatching. If the width of the web changes within the measuring range of the two sensors 1 and 2, wherein the range corresponds to a diameter of the sensor, the two sensors are moved outwards synchronously in opposite directions, for example in the case of a widening of the web. This ensures that the increased width of the web is kept in the measuring range of the sensors. Thus, control is ensured even when the width of the web fluctuates.

If the web is torn, the two sensors 1 and 2 are correspondingly moved inwards, as in narrowing of the web, as indicated by arrows in FIG. 1 in the fifth position from the top. Since the web is no longer present, the two sensors are moved inwards until one of the two sensors reaches the inner limit switch 6 or 6' associated therewith, after which the two sensors 1 and 2 are stopped and web centre control is interrupted. In the exemplary embodiment according to FIG. 1, the right-hand sensor 2 is the first to reach the limit switch 6' while the sensor 1 is still located at a distance from its limit switch 6. The two sensors 1 and 2 are stopped simultaneously. The device notices that the web is torn so that the device can switch over, the program for dealing with a torn web. A command is issued according to which the two sensors are moved outwards in a synchronized way, again until one of the two sensors reaches the outer limit switch. Then, the two sensors are again simultaneously stopped since the two sensor adjustment devices or motors 4, 4' are coupled electrically to one another. In the lowest position in FIG. 1, the left-hand sensor 1 has reached the outer limit switch 5, after which the two sensors 1 and 2 are stopped the illustrated positions, in which they are arranged symmetrically to the original web position as before.

FIG. 2 shows in the first position the position of the sensor in the last position in FIG. 1, a new web 3' of material being drawn into the machine. As illustrated in FIG. 2, the web 3' of material is drawn in for example offset to the right with respect to the centre of the machine while previously it was guided offset to the left with respect to the centre of the machine. For further movement of the web it will again be guided in this original position, as indicated in FIG. 2 by broken lines.

After the drawing in of the web in the outer position of the sensors 1 and 2, as is represented in the first position in FIG. 2, an edge search is triggered. The two sensors 1 and 2 are now adjusted synchronously in opposite directions in contrast with the edge search in the upper section in FIG. 1 where the electrical coupling of the two motors 4 and 4' is maintained. Due to the off-centre drawing-in of the web, the right-hand sensor 2 is the first to reach the edge of the web in the exemplary embodiment according to FIG. 2. Thereafter, the sensor 2 can be aligned with its working point or the centre of the sensor on the edge of the web, while the left-hand sensor 1 is moved along in the opposite direction. Then web edge control is started for this sensor 2, while both sensors 1 and 2 continue to move synchronously inwards. Through web edge control of the sensor 2, the web 3' is shifted towards the other sensor 1 by a web displacement means (not shown), as shown in FIG. 2, while the sensor 1 is moved synchronously inwards until this sensor 1 reaches the edge of the web. As soon as the second sensor 1 reaches the web, both motors 4, 4' are stopped and control is switched over to web center control.

Since the two sensors were simultaneously adjusted in opposite directions and their adjustment movement was simultaneously stopped during the entire positioning process of the sensors 1 and 2, the position of the web 3' represented at the lower end in FIG. 2 is again the same position as that of the web 3 in FIG. 1 before the tear in the web even if the web was located offset with respect to the centre of the machine.

The motors 4, 4' can be controlled independently from one another so that all operating functions are available like movement in opposite directions if a variation of the web width occurs or displacement in the same direction results in the case of a correction of the web position.

Preferably step motors or synchronous motors are used as the motors 4 and 4' to ensure synchronous operation of the two motors. If, for example DC motors are used, a follower control circuit is superimposed on the electrical coupling of the two DC motors to ensure synchronous operation.

The described method for sensor positioning can be used with optical-sensors and also with other types of sensors such as pneumatic sensors, acoustic sensors, inductive sensors or ultrasonic sensors.

When the limit switches 5 and 6 are actuated, a make contact is actuated which transmits a signal to the electronic signal processing device which, before the actual motor switch opens, emits a signal to stop the motor. In this way, the main contact for the motor control is no longer used to achieve exactly synchronous stopping of the motor at the coupled sensor adjustment devices.

We claim:

1. Device for positioning the sensors of a web movement control device having in each case one sensor on each side of the web of material and having a sensor adjustment device for each sensor, by means of which the two sensors can be adjusted independently of one another relative to the edges of the web, and having an electronic signal processing device which processes the signals emitted by the sensors and controls the sensor adjustment devices, wherein the two sensor adjustment devices can be coupled to one another in such a way that the two sensors move synchronously in opposite directions.

2. Device according to claim 1, wherein the two sensors are driven in each case by a step motor or synchronous motor.

3. A method for positioning two sensors in a web movement control device for sensing opposed edges of a web, wherein each of the two sensors is moved by a sensor adjustment device toward and away from an associated edge of the web and wherein the two sensors can be coupled to one another in such a way that the two sensors move synchronously in opposite directions, and wherein an electronic signal processing device processes signals from the sensors and controls the sensor adjustment devices, the method comprising the steps of:
   a) moving the two sensors synchronously towards to each other if there is a rupture of the web,
   b) stopping the movement of both sensors simultaneously as soon as one of the sensors reaches an associated inner limit switch,
   c) moving both sensors synchronously away from each other,
   d) stopping the movement of the sensors simultaneously as soon as one of the sensors reaches an associated outer limit switch,
   e) positioning a new web between the sensors, f) moving both sensors synchronously towards the web until one of the sensors reaches its respective associated edge of the web;

g) starting web movement control by the sensor which reached its respective associated edge first, h) moving both sensors synchronously until the other sensor reaches its associated edge of the web;

i) stopping the movement of both sensors simultaneously; and j) starting usual web movement control by using both sensors.

4. Method for positioning the sensors in a web centre control, sensors for detecting edges of the web being adjusted relative to the edges of the web by means of a sensor adjustment device in each case and the signals emitted by the sensors being processed in an electronic signal processing device which controls the sensor adjustment devices, wherein the two sensors are driven separately and independently of one another when searching for edges and are coupled to one another for the centre control and after a tear in the web for repositioning of the sensors in such a way that they are moved synchronously in opposite directions and are stopped and restarted simultaneously.

5. Method according to claim 4, wherein the two sensors are stopped simultaneously if one of the two sensors has reached a limit switch after which the two sensors are simultaneously restarted.

6. A web movement control apparatus comprising:
first and second sensors, said first sensor located on a first side of a web of material and said second sensor located on a second side of said web of material for respectively detecting a first edge and a second edge of said web of material and generating position signals;
first and second sensor adjustment means for respectively adjusting said first and second sensors relative to said first edge and said second edge of said web of material, said first and second adjustment means being adjusted independently until said first and second sensors are respectively located at said first edge and said second edge of said web of material;
means for coupling mechanical motion of said first and second adjustment means when said first and second sensors are respectively located at said first edge and said second edge of said web of material, said first and second sensors being adjusted synchronously in opposite directions; and
means which receives said position signals for controlling said first and second adjustment means based on said position signals.

7. The apparatus of claim 6 wherein said first and second adjustment means each include one of a step motor and a synchronous motor.

8. The apparatus of claim 6 wherein said coupling means includes a switch for electrically coupling said first and second adjustment means.

9. A method for positioning sensors used in web movement control, said method comprising the steps of:
independently moving first and second sensors relative to a first edge and a second edge of a web of material while searching for said first edge and said second edge of said web of material;
generating position signals indicative of a position of said first and second sensors;
controlling movement of said first and second sensors based on said position signals;
respectively detecting said first edge and said second edge of said web of material with said first and second sensors; and
synchronously moving said first and second sensors in opposite directions after said first edge and said second edge of said web of material have been detected.

10. The method of claim 9 further including the step of coupling first and second sensor movement adjustment means when said first edge and said second edge of said web of material have been detected.

11. The method of claim 9 further including the step of simultaneously stopping synchronous movement of said first and second sensors when one of said first and second sensors reaches a first predetermined position.

12. The method of claim 11 further including the steps of:
simultaneously restarting synchronous movement of said first and said second sensor in a reverse direction; and
simultaneously restopping synchronous movement when one of said first and second sensors reaches a second predetermined position.

* * * * *